United States Patent

[11] 3,592,495

| [72] | Inventor | Julian V. Fisher<br>Carpentersville, Ill. |
|---|---|---|
| [21] | Appl. No. | 844,106 |
| [22] | Filed | July 23, 1969 |
| [45] | Patented | July 13, 1971 |
| [73] | Assignee | Illinois Tool Works Inc.<br>Chicago, Ill. |

[54] LATCHING DEVICE
9 Claims, 7 Drawing Figs.

[52] U.S. Cl............................................. 292/76,
24/73, 292/DIG. 38
[51] Int. Cl..................................................... E05c 19/06
[50] Field of Search........................................... 272/76, 70,
78, 17, 18; 85/5, 80; 24/73 B, 73 MF, 73 HS, 73
PM, 73 PF

[56] References Cited
UNITED STATES PATENTS

| 2,852,829 | 9/1958 | Holton | 24/73 |
|---|---|---|---|
| 2,946,612 | 7/1960 | Ahlgren | 292/17 |
| 3,015,869 | 1/1962 | Rapata | 24/213 |
| 3,103,378 | 9/1963 | Ahlgren | 292/17 |
| 3,251,103 | 5/1966 | Saut | 24/73 |

*Primary Examiner*—Ian A. Calvert
*Assistant Examiner*—Robert L. Wolfe
*Attorneys*—Olson, Trexler, Wolters and Bushnell, Robert W. Beart, Michael Kovac, Barry L. Clark and Jack R. Halvorsen ABSTRACT: A latching device molded in one piece from a tough resilient plastic material for securing one member such as a top to a second member such as a washing machine cabinet, which latching member has a relatively strong and unyielding shoulder portion on a shank insertable through and engageable beneath the second member, resiliently collapsible shoulder portions on the shank for engaging behind the second member, and shoulder and abutment means on an outwardly extending head portion of the device positioned over the relatively rigid shoulder from the shank for engaging the flange of the first member for holding the first member down and preventing lateral shifting thereof.

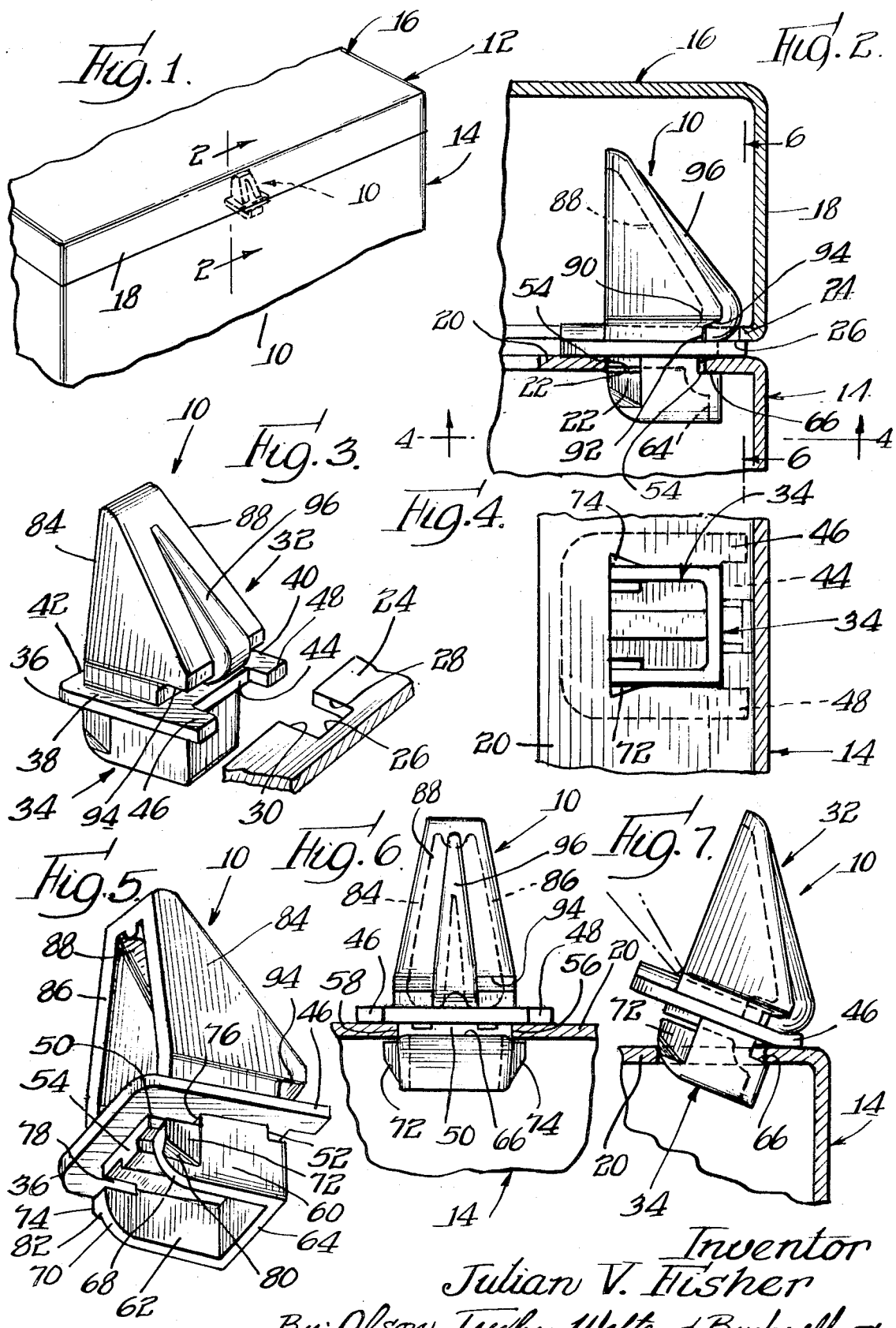

LATCHING DEVICE

The present invention relates to a novel latching device, and more specifically to a novel latching device especially suitable for releasably securing or anchoring one member with respect to a second member.

While numerous different applications for latching devices incorporating features of the present invention may suggest themselves, it is contemplated that such latching devices are especially suitable for securing top members of appliances such as washing machines to the cabinet of the appliance. In such appliances, the top members are frequently formed from sheet metal and may be hinged to or removably connected to the main body of the cabinet. In any event, heretofore sheet metal latching devices have been provided for releasably securing the top member in the closed position. Such sheet metal devices are subject to corrosion and frequently have been relatively expensive to manufacture and assemble and difficult to use. Furthermore, such heretofore used metal fasteners or latching devices have frequently been constructed so that an excessive number of the devices is required in order to secure the top member of the cabinet in the desired fashion.

An important object of the present invention is to provide a novel latching device especially suitable for releasably securing one member such as the top of an appliance to a second member such as the cabinet of the appliance, which novel latching device is of relatively economical construction and is easily used.

A more specific object of the present invention is to provide a novel latching device of the above-described type formed from a tough resilient plastic material so as to eliminate rusting problems.

A still further specific object of the present invention is to provide a latching device of the above-described type which is constructed so that it may be easily applied to an apertured workpiece without the aid of auxiliary fasteners and which at the same time is capable of securely retaining another workpiece in a manner such that when the other workpiece is to be pulled or shifted to an open position, the latching device will not become detached from the first mentioned workpiece.

A still further object of the present invention is to provide a novel one-piece simple latching device of the above-described type which is constructed for securely retaining the top member of an appliance or the like in a manner such that the number of fastening devices required may be reduced.

Other objects and advantages of the present invention will become apparent from the following description and the accompanying drawings wherein:

FIG. 1 is a fragmentary perspective view of an appliance such as a washing machine incorporating a latching device constructed in accordance with features of the present invention;

FIG. 2 is an enlarged fragmentary partial sectional view taken generally along line 2-2 in FIG. 1;

FIG. 3 is an exploded fragmentary perspective view showing a latching device incorporating features of the present invention and a complementary portion of a workpiece adapted to be secured by the latching device;

FIG. 4 is a fragmentary sectional view taken generally along line 4-4 in FIG. 2;

FIG. 5 is another perspective view showing a latching device incorporating features of the present invention;

FIG. 6 is a fragmentary sectional view taken generally along line 6-6 in FIG. 2; and FIG. 7 is a fragmentary partial sectional view showing the manner in which a latching device incorporating features of the present invention is adapted to be assembled with one workpiece such, for example, as the cabinet of a washing machine.

Referring now more specifically to the drawings wherein like parts are designated by the same numerals throughout the various figures, a latching device 10 incorporating features of the present invention is shown installed in a work assembly 12 in FIGS. 1 and 2. It will be appreciated that the latching device may be utilized in a variety of different work assemblies. In the embodiment shown, it is contemplated that the work assembly 12 is in the form of an appliance such as a washing machine having a main cabinet 14 and a top member 16. As will be understood, the top member 16 is removably secured with respect to the base cabinet so as to permit servicing. For example, the top member 16 may be hinged along the rear margin thereof to the cabinet 14 by suitable known means, not shown, so that the front margin 18 may be lifted from the closed position shown to a raised open position. The latching device 10 serves as will be fully described below to releasably secure the front margin of the top member 16 with respect to the base cabinet.

The first work member or cabinet 14 is provided with an inturned horizontal flange 20 along the front upper margin thereof. A noncircular and preferably rectangular aperture 22 is formed in the flange 20 for receiving the latching device as will be hereinafter described. The second work member or top 16 also is formed with an inturned flange 24 projecting generally horizontally inwardly from the lower margin of the depending front edge section 18 for overlying the flange 20 of the base or cabinet member 14. As shown in FIGS. 2 and 3, the flange 24 is formed with a notch 26 defined by opposite side edges 28 and 30 for cooperative engagement with the latching device in the manner set forth below.

The latching device 10 is especially suitable to be rapidly and economically molded in one piece from a tough resilient plastic material such as nylon or polyethylene. The device is provided with a head portion 32 and a generally axially extending shank portion 34. The head portion has a first section 36 with transverse dimensions greater than corresponding dimensions of the workpiece aperture 22 so that the head section is adapted to transverse the aperture and overlie the flange 20 when the latching device is assembled with the base or cabinet 14. More specifically, the head section has oppositely laterally extending side margins 38 and 40 and a laterally extending rear margin 42. A forward margin of the head section 36 is relieved as at 44 for presenting a pair of forwardly projecting relatively flexible resilient fingers or tabs 46 and 48.

The shank portion 34 has a first section 50 integrally joined to the underside of the head section 36 and being substantially solid and of a configuration for substantially traversing the workpiece aperture 22 when the device is assembled with the workpiece. More specifically, the shank section has forward and rear edges 52 and 54 spaced apart a distance similar to but slightly less than the distance between the forward and rear edges of the aperture 22 as shown best in FIG. 2 and the shank section similarly has opposite side edges 56 and 58 spaced apart substantially the same distance as the opposite side edges of the workpiece aperture 22 as shown in FIG. 6. Thus the shank section 54 provides the shank with a substantially solid and rugged element for absorbing any transverse or shear loads which may be applied to the latching device.

Extending axially from the shank section 50 are opposite sidewall sections 60 and 62 and a front wall section 64. As shown in FIGS. 2, 5 and 7, the front wall 64 is offset forwardly of the forward edge 52 of the shank section 50 and an integral junction between the upper edge of the front wall 64 and the shank section 50 provides a solid relatively rigid shoulder 66 which is spaced axially from the underside of the head section 36 a distance similar to and slightly greater than the thickness of the workpiece flange 20. Thus the shoulder 66 is adapted to be engaged beneath the workpiece flange 20 when the latching device is assembled with the cabinet member.

The back side of the shank portion is open so that the opposite wall sections 60 and 62 present free rearwardly facing edges 68 and 70. These edges are rounded as shown in the drawings so that the distance between the rounded edges and a forward marginal portion of the shoulder 66 is slightly less than the distance between the forward and rear edges of the workpiece aperture 22. This the shank portion is adapted to be inserted through the aperture 22 by first tilting the latching device forwardly with respect to the workpiece and hooking the shoulder 66 beneath the flange 20 as shown in FIG. 7, and then rotating the device around the forward edge of the workpiece aperture so that the rounded edges 68 and 70 of the shank wall sections are forced through the aperture. It is to be noted, that the resiliently flexible fingers or tabs 46 and 48 of the head section 36 are adapted to bend as shown in FIG. 7 for permitting the shoulder 66 to be inserted through the workpiece aperture.

When the latching device is assembled with the workpiece flange 20, the solid substantially rigid shoulder 66 securely prevents the forward side of the shank portion from being pulled axially out through the aperture unless the device is reversely rotated about the forward margin of the aperture. Such reverse rotation is prevented by providing the opposite sidewall sections 60 and 62 of the shank portion with laterally projecting shoulders or lugs 72 and 74. These shoulders are axially spaced from the underside of the head section 36 in the same manner as the shoulder 66 so that they are adapted to snap beneath the workpiece flange. In order to facilitate insertion of the shoulder elements 72 and 74 through the workpiece aperture, the shank section 50 is relieved or cut away at 76 and 78 so that portions of the shank wall sections 60 and 62 carrying the lugs or shoulders are free to flex inwardly. In addition, the lugs or shoulders are formed with cam surfaces 80 and 82 facing axially downwardly for engaging edges of the workpiece during the assembly process and forcing the shoulders 72 and 74 inwardly until they pass sufficiently through the workpiece aperture to snap beneath the flange 20. In the event it is desired to remove the latching device from the flange 20 for any reason, the shoulders 72 and 74 may be manually forced inwardly sufficiently to clear the underside of the workpiece flange 20 whereupon the device may be rotated forwardly and lifted out of the aperture.

In order to retain the top member 16, the head portion of the latching device has an axially upwardly extending preferably hollow hooklike portion including opposite sidewall sections 84 and 86 and a front wall section 88. As shown best in FIG. 2, the front wall section has a lower margin 90 integral with the head section 36 and presenting a forwardly facing edge 92 substantially in axial alignment with the edge 52 of the shank portion. The front wall section then extends sharply forwardly to present a shoulder 94 spaced axially outwardly from the head section 36 and adapted to overlie and engage the flange 24 of the top member 16. The remainder of the front wall 88 is inclined upwardly and rearwardly from the shoulder 94 for serving as a cam surface or guide for directing the top member flange 24 downwardly and to the shoulder 94 during assembly of the parts. The head section 36 and particularly the finger elements 44 and 48 thereof serve as a spacer for preventing direct contact between the flanges 20 and 24.

A rib or forwardly projecting abutment element 96 is formed on the forward wall 88 of the head portion. As shown in FIGS. 2 and 3, the rib extends from the edge 92 around the shoulder 94 and upwardly along a central portion of the wall 88. Furthermore, the rib tapers from its lower end toward its upper end. During assembly of the top member 16 with the latching device, a free edge of the flange 24 normally initially engages the wall 88 toward an upper end thereof and then slides downwardly. The top member is positioned so that during this downward movement, the narrow upper end of the rib 96 enters the notch 26 in the flange 24. The lower end of the rib 96 has a transverse width similar to but slightly less than the distance between the side edges 28 and 30 of the notch 26 so that when the top member is completely assembled, the rib substantially engages the edges 28 and 30 and secures the top member against lateral displacement relative to the base cabinet. At the same time, free margins of the flange 24 engage beneath the shoulder 94 at opposite sides of the rib for securing the top member in the closed position.

While a preferred embodiment of the present invention has been shown and described herein, it is obvious that many details may be changed.

I claim:

1. A one-piece plastic latching device for releasably connecting a first member of predetermined thickness and having an aperture therethrough and a second member, comprising a body including a shank portion insertable through said aperture in said first member and a head portion, said head portion including a first head section projecting laterally for overlying said first member, said shank portion including substantially rigid unyielding shoulder means spaced axially from and generally facing one margin of said head section for engaging beneath said first member when the shank portion is inserted through said aperture, said shank portion including second resiliently collapsible shoulder means spaced axially from and generally facing another marginal portion of said head section for being snapped behind said first member when the shank portion is inserted through said aperture, and said head portion including cam surface means, shoulder means on opposite sides of said cam surface means axially spaced outwardly from and generally facing said first marginal portion of said head section and also said first mentioned shank portion shoulder means for overlying a part of said second member when the second member is assembled with the first member.

2. A latching device, as defined in claim 1, wherein said head portion further includes cam means in form of a rib inclined upwardly and away from said first marginal portion of said head section for guiding said second member to said head portion shoulder means during assembly of said members with each other.

3. A latching device, as defined in claim 1, wherein said shank portion includes a substantially solid rigid section between said head section and said shank portion shoulder means for substantially traversing said aperture and sustaining any shear forces applied to the latching device when the device is assembled with said members.

4. A latching device, as defined in claim 3, wherein said shank portion includes a front wall section extending axially from said rigid shoulder means and opposite sidewall sections joining opposite end margins of said front wall section, said shank portion being substantially hollow between said wall sections and a side of said shank portion opposite from said front wall section being open.

5. A latching device, as defined in claim 1, wherein a major part of said shank portion is substantially hollow, said shank portion comprising a front wall section extending axially from said rigid shoulder means and opposite sidewall sections integrally joining opposite end margins of said front wall section, a side of said shank portion opposite from said front wall section being substantially open.

6. A latching device, as defined in claim 5, wherein said opposite sidewall sections include axially extending marginal portions opposite from the end margins of front wall sections, said axially extending marginal portions including the resiliently collapsible shoulder means and being separated from said head section for facilitating collapsing of the last mentioned shoulder means during insertion of the shank portion through said aperture.

7. A latching device for releasably connecting a first member of predetermined thickness and having an aperture therethrough and a second member comprising a body including a shank portion insertable through said aperture in said first member and a head portion, said head portion including a first head section projecting laterally for overlying said first member, said shank portion including substantially rigid unyielding shoulder means spaced axially from and generally facing one margin of said head section for engaging beneath said first member when the shank portion is inserted through said aperture, said shank portion including second resiliently collapsible shoulder means spaced axially from and generally facing another marginal portion of said head section for being snapped behind said first member when the shank portion is inserted through said aperture, said head portion including shoulder means axially spaced outwardly from and generally facing said first marginal portion of said head section and also said first-mentioned shank portion shoulder means for overlying a part of said second member when the second member is assembled with the first member, and said head portion including rib means projecting forwardly from said head portion shoulder means and engageable in a notch in said second member for restraining the second member against lateral displacement relative to the latch device.

8. A latching device for releasably connecting a first member of predetermined thickness and having an aperture therethrough and a second member, comprising a body including a shank portion insertable through said aperture in said first member and a head portion, said head portion including a first head section projecting laterally for overlying said first member, said shank portion including substantially rigid unyielding shoulder means spaced axially from and generally facing one margin of said head section for engaging beneath said first member when the shank portion is inserted through said aperture, said shank portion including second resiliently collapsible shoulder means spaced axially from and generally facing another marginal portion of said head section for being snapped behind said first member when the shank portion is inserted through said aperture, and said head portion including shoulder means axially spaced outwardly from and generally facing said first marginal portion of said head section and also said first-mentioned shank portion shoulder means for overlying a part of said second member when the second member is assembled with the first member, said head portion also including resilient tab means projecting forwardly from said one marginal portion of said head section, said tab means being deformable during assembly of said shank portion rigid shoulder means and said tab means being disposed between said rigid shoulder means and the head portion shoulder means for spacing said first and second members from each other.

9. A latching device for releasably connecting a first member of predetermined thickness and having an aperture therethrough, and a second member comprising a body including a shank portion insertable through said aperture in said first member and a head portion, said head portion including a first head section projecting laterally for overlying said first member, said shank portion including substantially rigid unyielding shoulder means spaced axially from and generally facing one margin of said head section for engaging beneath said first member when the shank portion is inserted through said aperture, said shank portion including second resiliently collapsible shoulder means spaced axially from and generally facing another marginal portion of said head section for being snapped behind said first member when the shank portion is inserted through said aperture, said shank portion comprising a front wall section extending axially from said rigid shoulder means and opposite sidewall sections integrally joining opposite from said wall sections, a side of said shank portion opposite from said wall section being substantially open, the resiliently collapsible shoulder means being associated with said sidewall sections, and said head portion including shoulder means axially spaced outwardly from and generally facing said first marginal portion of said head section and also said first-mentioned shank portion shoulder means for overlying a part of said second member when the second member is assembled with the first member, said head portion including an elongated rib extending generally axially of said head portion front wall section.

UNITED STATES PATENT OFFICE
CERTIFICATE OF CORRECTION

Patent No. 3,592,495  Dated July 13, 1971

Inventor(s) Julian V. Fisher

It is certified that error appears in the above-identified patent and that said Letters Patent are hereby corrected as shown below:

Column 2, line 34, change "transverse" to --traverse--;
Column 2, line 75, change "This" to --Thus--.

Column 6, line 22, cancel "from said" and substitute therefor --end margins of said front--.

Signed and sealed this 15th day of February 1972.

(SEAL)
Attest:

EDWARD M. FLETCHER, JR.
Attesting Officer

ROBERT GOTTSCHALK
Commissioner of Patents